US012618338B2

(12) United States Patent
Sanzari et al.

(10) Patent No.: US 12,618,338 B2
(45) Date of Patent: May 5, 2026

(54) BEARING WITH OUTER SLEEVE FOR SQUEEZE FILM DAMPING

(71) Applicant: PRATT & WHITNEY CANADA CORP., Longueuil (CA)

(72) Inventors: Lorenzo Sanzari, Montreal (CA); Rose-Elizabeth Banville, Longueuil (CA); Mike Fontaine, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/431,064

(22) Filed: Feb. 2, 2024

(65) Prior Publication Data

US 2025/0250911 A1 Aug. 7, 2025

(51) Int. Cl.
*F01D 25/16* (2006.01)
*F01D 25/04* (2006.01)
*F16C 27/04* (2006.01)
*F16C 33/66* (2006.01)

(52) U.S. Cl.
CPC ........... *F01D 25/164* (2013.01); *F01D 25/04* (2013.01); *F16C 27/045* (2013.01); *F16C 33/6681* (2013.01); *F05D 2230/80* (2013.01); *F16C 2360/23* (2013.01)

(58) Field of Classification Search
CPC ...... F01D 25/04; F01D 25/164; F16C 27/045; F16C 33/6681; F16C 35/077; F16C 2360/23; F05D 2230/80
USPC ......................................................... 415/119
See application file for complete search history.

(56) References Cited

U.S. PATENT DOCUMENTS

| | | | | |
|---|---|---|---|---|
| 3,357,757 A | * | 12/1967 | Morley | .................... F16C 27/04 60/39.08 |
| 3,456,992 A | * | 7/1969 | Kulina | ................... F16C 27/045 384/100 |
| 3,574,424 A | | 4/1971 | Hagemeiseter | |
| 3,652,139 A | * | 3/1972 | Memery | ............... F16C 27/045 384/99 |
| 5,433,584 A | * | 7/1995 | Amin | ..................... F16C 27/045 415/230 |
| 5,452,504 A | * | 9/1995 | Tatro | ...................... F16C 35/077 29/898.07 |
| 8,182,153 B2 | | 5/2012 | Singh et al. | |

(Continued)

OTHER PUBLICATIONS

European search report issue in counterpart EP application No. 25155398.8 on Jul. 8, 2025.

*Primary Examiner* — Nathaniel E Wiehe
*Assistant Examiner* — Justin A Pruitt
(74) *Attorney, Agent, or Firm* — NORTON ROSE FULBRIGHT CANADA LLP

(57) ABSTRACT

An aircraft engine, has: a shaft rotatable about a central axis; a bearing housing extending around the shaft and defining a bearing cavity; a bearing located within the bearing cavity, the bearing rotatably supporting the shaft, the bearing having rolling members disposed radially between an inner race engaged to the shaft and an outer race; an outer sleeve secured to and extending around the outer race of the bearing, a radially-inner face of the outer sleeve abutting a radially-outer face of the outer race; and a squeeze film damper including an annulus defined radially between the outer sleeve and a portion of the bearing housing and axially between seals, the annulus having a damping fluid in the annulus.

12 Claims, 4 Drawing Sheets

(56) References Cited

U.S. PATENT DOCUMENTS

| 8,475,116 | B2 |  | 7/2013 | Trommer et al. | |
|---|---|---|---|---|---|
| 8,834,095 | B2 | * | 9/2014 | Davis | F04D 29/059 |
|  |  |  |  |  | 415/171.1 |
| 8,888,447 | B2 |  | 11/2014 | House et al. | |
| 9,068,598 | B2 |  | 6/2015 | House et al. | |
| 9,391,483 | B2 | * | 7/2016 | Kaneko | H02K 5/1732 |
| 9,464,637 | B2 |  | 10/2016 | Nguyen-Schaefer | |
| 9,581,044 | B2 |  | 2/2017 | House et al. | |
| 9,631,493 | B2 |  | 4/2017 | Morreale et al. | |
| 9,951,817 | B2 | * | 4/2018 | Meyers | F16C 27/045 |
| 10,233,778 | B2 |  | 3/2019 | Gysling et al. | |
| 10,329,952 | B2 | * | 6/2019 | Flouros | F16C 33/6651 |
| 10,329,953 | B2 |  | 6/2019 | Hovhannisian et al. | |
| 10,458,277 | B1 |  | 10/2019 | Von Berg | |
| 10,760,614 | B2 |  | 9/2020 | Taguchi | |
| 10,808,713 | B2 | * | 10/2020 | Lucchetta | F04D 29/059 |
| 11,085,330 | B2 |  | 8/2021 | Pankratov et al. | |
| 2012/0028773 | A1 | * | 2/2012 | MacFarlane | F16C 35/077 |
|  |  |  |  |  | 492/47 |

* cited by examiner

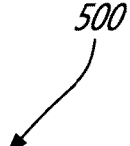

Remove the squeeze film damping bearing out of the aircraft engine ~502

Obtain a bearing having rolling members disposed between an inner race and an outer race ~504

Mount an outer sleeve to the outer race of the bearing, a diameter of a radially-outer face of the outer sleeve selected provide an annulus between the outer sleeve and the bearing housing, the annulus receiving a damping fluid. ~506

BEARING WITH OUTER SLEEVE FOR SQUEEZE FILM DAMPING

TECHNICAL FIELD

The disclosure relates generally to aircraft engines and, more particularly, to bearing assemblies and squeeze film dampers used with bearing assemblies.

BACKGROUND

Aircraft engines, such as gas turbine engines, use bearings for supporting rotating shafts. Bearings are typically contained within bearing cavities defined by bearing housings, within which the bearings are radially supported. In some engines, squeeze film dampers are located radially between outer races of the bearings and the bearing housings. Such squeeze film dampers are fed with oil and at least partially dampen vibrations of the shaft. Because of the oil film disposed radially between two components, there may be a need to prevent axial and radial relative motions of these components. Existing solutions may be suitable for their intended purposes, but there is always room for improvements.

SUMMARY

In one aspect, there is provided an aircraft engine, comprising: a shaft rotatable about a central axis; a bearing housing extending around the shaft and defining a bearing cavity; a bearing located within the bearing cavity, the bearing rotatably supporting the shaft, the bearing having rolling members disposed radially between an inner race engaged to the shaft and an outer race; an outer sleeve secured to and extending around the outer race of the bearing, a radially-inner face of the outer sleeve abutting a radially-outer face of the outer race; and a squeeze film damper including an annulus defined radially between the outer sleeve and a portion of the bearing housing and axially between seals, the annulus having a damping fluid in the annulus.

The aircraft engine described above may include any of the following features, in any combinations.

In some embodiments, the outer sleeve is press fitted on the outer race.

In some embodiments, the outer sleeve defines grooves extending from a radially-outer face of the sleeve towards the radially-inner face, the seals received within the grooves.

In some embodiments, the seals are sealing rings.

In some embodiments, a carbon seal is located radially between the bearing housing and a seal runner mounted to the shaft.

In some embodiments, the outer sleeve includes an axial retention member abutting one or more of the bearing housing and the carbon seal.

In some embodiments, the axial retention member is an axial stand-off protruding axially from a body of the outer sleeve, the axial stand-off abutting the carbon seal.

In some embodiments, the axial stand-off includes two diametrically opposed axial stand-offs.

In some embodiments, a bearing-to-sleeve anti-rotation feature is configured for preventing rotation of the outer sleeve relative to the outer race of the bearing.

In some embodiments, a sleeve-to-housing anti-rotation feature is configured for preventing rotation of the outer sleeve relative to the bearing housing.

In another aspect, there is provided a bearing assembly, comprising: a bearing housing extending around a central axis to enclose a bearing cavity; a bearing within the bearing cavity, the bearing having an inner race for engaging a shaft, rolling members rollingly engaged to the inner race, and a compound outer race including: an outer race rollingly engaging the rolling members; and an outer sleeve mounted to a radially-outer face of the outer race, the outer sleeve being non-rotatable relative to the outer race of the bearing; and a squeeze film damper including an annulus defined radially between the outer sleeve and the bearing housing and axially between seals, the annulus having a damping fluid in the annulus.

The bearing assembly described above may include any of the following features, in any combinations.

In some embodiments, the outer sleeve defines grooves extending from a radially-outer face of the sleeve towards a radially-inner face of the outer sleeve, the seals received within the grooves.

In some embodiments, a carbon seal is located radially between the bearing housing and a seal runner mounted to the shaft.

In some embodiments, the outer sleeve includes an axial retention member abutting one or more of the bearing housing and the carbon seal.

In some embodiments, a bearing-to-sleeve anti-rotation feature is configured for preventing rotation of the outer sleeve relative to the outer race of the bearing.

In some embodiments, a sleeve-to-housing anti-rotation feature is configured for preventing rotation of the outer sleeve relative to the bearing housing.

In yet another aspect, there is provided a method of replacing a squeeze film damping bearing by a conventional bearing in a bearing housing of an aircraft engine, comprising: removing the squeeze film damping bearing out of the aircraft engine; obtaining a bearing having rolling members disposed between an inner race and an outer race; and mounting an outer sleeve to the outer race of the bearing, a diameter of a radially-outer face of the outer sleeve selected to provide an annulus between the outer sleeve and the bearing housing, the annulus receiving a damping fluid.

The method described above may include any of the following features, in any combinations.

In some embodiments, the mounting of the outer sleeve to the outer race includes press fitting the outer sleeve to the outer race.

In some embodiments, the mounting of the outer sleeve includes preventing rotation of the outer sleeve relative to the outer race and preventing rotation of the outer sleeve relative to the bearing housing.

In some embodiments, the method includes installing the bearing with the outer sleeve into a bearing cavity defined by the bearing housing, including abutting axial stand-offs of the outer sleeve against a carbon seal.

DESCRIPTION OF THE DRAWINGS

Reference is now made to the accompanying figures in which:

FIG. 5 is a flowchart illustrating steps of a method of replacing a squeeze film damping bearing by a conventional bearing.

DETAILED DESCRIPTION

Figure 1:
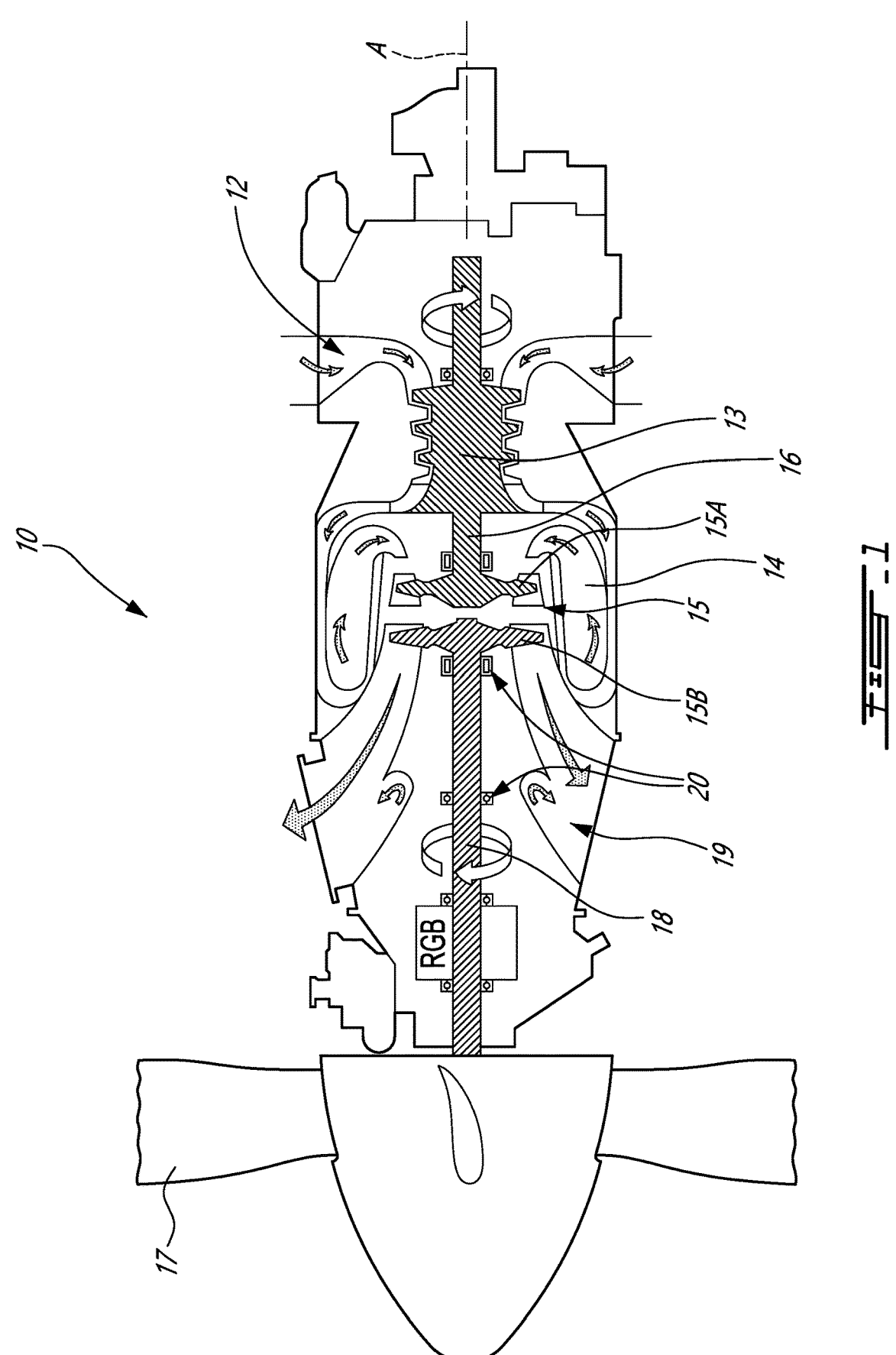
FIG. 1 is a schematic cross-sectional view of an aircraft engine exemplified as a gas turbine engine.

FIG. 1 illustrates an aircraft engine depicted as a gas turbine engine 10 of a type preferably provided for use in subsonic flight, generally comprising, in serial flow communication, an inlet 12 for receiving air, a compressor section 13 for compressing the air received via the inlet 12, a combustor 14 for mixing fuel with the compressed air and for generating an annular stream of combustion gases, and a turbine section 15 receiving the combustion gases from the combustor 14. The turbine section 15 has a high-pressure turbine 15A drivingly engaged to the compressor section 13 via a high-pressure shaft 16, which is rotatable about a centerline A of the gas turbine engine 10. The turbine section 15 further has a power or low-pressure turbine 15B downstream of the high-pressure turbine 15A and drivingly engaged to a propeller 17 via a low-pressure shaft 18. The low-pressure shaft 18 may be directly engaged to the propeller 17 or, as shown herein, drivingly engaged to the propeller 17 via a reduction gearbox RGB. The gas turbine engine 10 has an exhaust 19 for expelling the combustion gases. Although the depicted gas turbine engine 10 is a turboprop engine, the present disclosure may apply to other engines, such as turbofan engines, turboshaft engines and to auxiliary power units (APU). Also, it is understood that the engine could be embodied in the form of hybrid engine including an electric motor and a thermal engine. In an alternate embodiment, the compressor section may include a high-pressure compressor drivingly engaged to the high-pressure turbine 15A via the high-pressure shaft 16 and a low-pressure compressor drivingly engaged to the low-pressure turbine 15B via the low-pressure shaft 18.

As shown in FIG. 1, the gas turbine engine 10 includes a plurality of bearings 20 axially spaced apart from one another along the axis A. The bearings 20 are contained within bearing cavities 29 (FIG. 2) for lubrication purposes. In some cases, the shafts may vibrate. These vibrations may be transmitted from the shafts to static structures surrounding the shafts through the bearings 20. It may be desired to dampen these vibrations.

Figure 2:
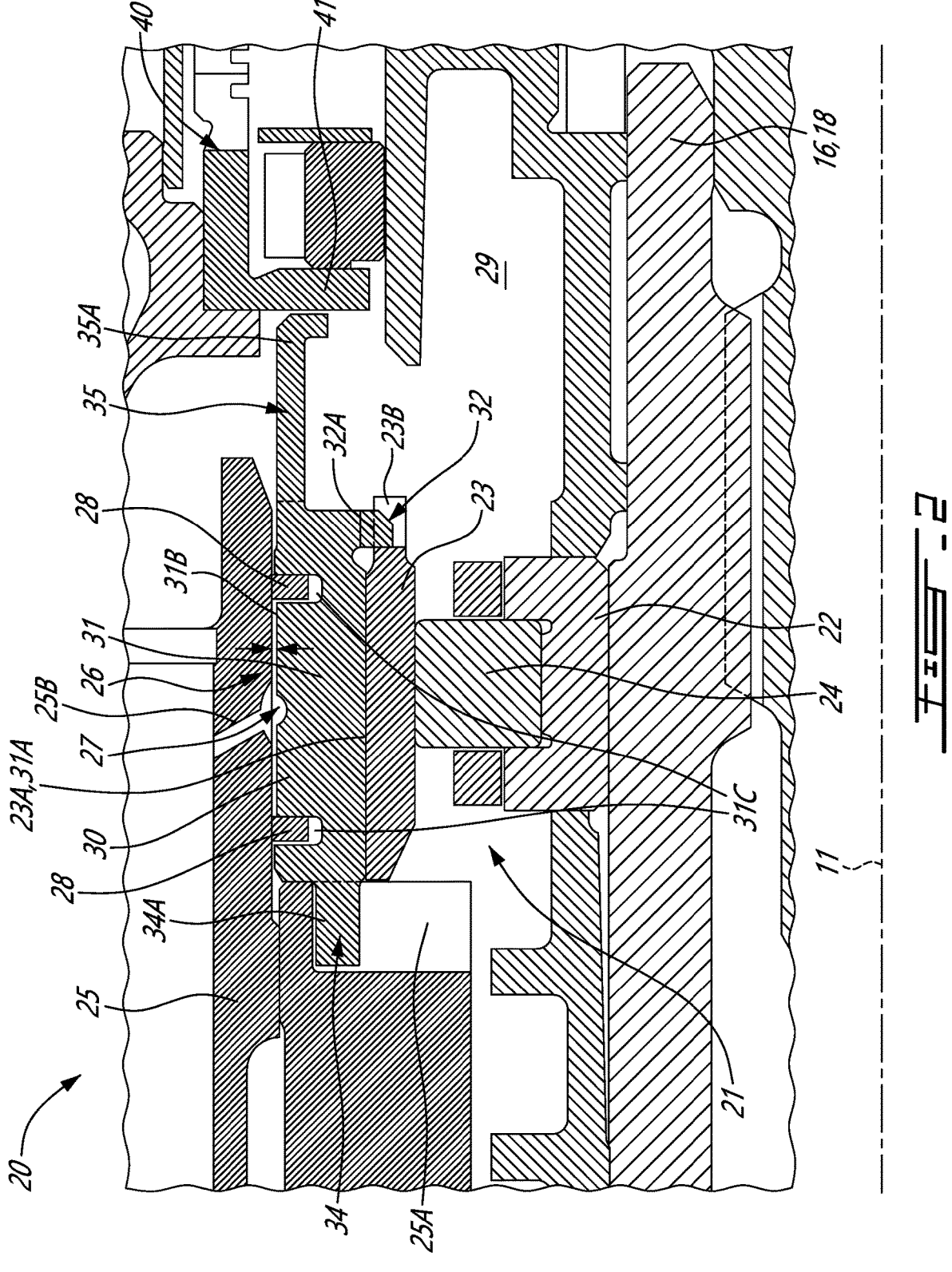
FIG. 2 is a cross-sectional view of a bearing assembly of the gas turbine engine of FIG. 1.

Referring now to FIG. 2, one example of the bearing assemblies 20 is described in more detail. The bearing assembly 20 includes a bearing 21. Although the bearing assembly 20 is depicted as containing only one bearing 21, it may alternatively contain a plurality of bearings 21. The bearing 21 has an inner race 22 secured to a shaft, such as the high-pressure shaft 16 or the low-pressure shaft 18, an outer race 23 surrounding the inner race 22, and rolling elements 24, such as balls or cylindrical or frustoconical rollers, disposed radially between the inner race 22 and the outer race 23. The rolling elements 24 rotate about their respective central axis and about a central axis 11 of the gas turbine engine 10 to permit a rotation of the inner race 22 relative to the outer race 23. The outer race 23 is typically non-rotatable relative to the central axis 11 and is secured to a bearing housing 25. The bearing housing 25 encloses a bearing cavity 29 that contains the bearing 21. The bearing housing 25 is secured to an outer case of the gas turbine engine 10. Thus, loads may be transmitted along a load path extending radially outwardly from the shaft to the outer casing through the bearing 21 and the bearing housing 25. However, in some situations, the shaft may not be perfectly balanced. This imbalance may create vibrations. To at least partially alleviate these vibrations, a squeeze film damper 26 is disposed radially between the bearing 21 and the bearing housing 25. The squeeze film damper 26 is thus part of the load path that transfers the loads from the shaft to the outer casing of the engine 10.

In some cases, it may be desired to use a conventional bearing, such as the bearing 21 shown in FIG. 2, which is devoid of squeeze film damping capabilities, for cost saving purposes. However, some configurations may need damping vibrations of the bearing 21. The present disclosure present an outer sleeve that may be used to provide squeeze film damping capabilities to a conventional bearing.

Still referring to FIG. 2, in the embodiment shown, the outer race 23 is part of a compound outer race that further includes an outer sleeve 30. The outer sleeve 30 is secured to and extends around the outer race 23 of the bearing 21. The outer sleeve 30 includes a body 31 that extends annularly all around the central axis 11 (which may be coaxial to the engine centerline A). The body 31 may be a single monolithic part, or may be manufactured by assembling a plurality of segments to define its annular structure. The body 31 extends radially relative to the central axis 11 between a radially-inner face 31A and a radially-outer face 31B. The radially-inner face 31A of the outer sleeve 30 abuts a radially-outer face 23A of the outer race 23. The outer sleeve 30 may be press fitted on the outer race 23. Put differently, an interference fit may be provided between the outer sleeve 30 and the outer race 23. In an embodiment, a diameter of the radially-inner face 31A of the outer sleeve may be less than a diameter of the radially-outer face 23A of the outer race 23 when these two components are disassembled. The outer sleeve 30 and the outer race 23 may be assembled by expanding the outer sleeve 30 by heating the outer sleeve 30 and/or by shrinking the outer race 23 by exposing it to a cold medium to mount the outer sleeve 30 to the outer race 23. Any other suitable ways of securing the outer sleeve 30 to the outer race 23 are contemplated.

The radially-inner face 31A of the body 31 of the outer sleeve 30 may be a cylindrical face being in contact with the outer race 23 of the bearing 21 all around its circumference. The radially-inner face 31A of the body 31 of the outer sleeve 30 may be devoid of grooves or other feature. The radially-inner face 31A of the outer sleeve 30 may define a contact cylindrical plane with the outer race 23 extending axially along an entirety of an axial length of the radially-outer face 23A of the outer race 23 of the bearing 21. The outer sleeve 30 and the outer race 23 are non-movable one relative to the other in a radial direction since the outer sleeve 30 and the outer race 23 are free of a gap therebetween. There is no damping fluid to be received between the outer sleeve 30 and the outer race 23.

As depicted in FIG. 2, the squeeze film damper 26 is provided between the outer sleeve 30 and the bearing housing 25. Put differently, a diameter of the radially-outer face 31B of the body 31 of the outer sleeve 30 is less than that of the bearing housing 25, that is, less than a diameter of a member of the bearing housing 25 that axially overlaps the outer sleeve 30, to provide an annulus 27 radially between the bearing housing 25 and the outer sleeve 30. A damping fluid, such as oil, is received in the annulus 27. The annulus 27 may be fluidly connected to a source of this damping fluid via an aperture 25B defined through the bearing housing 25 and may be continuously fed with the damping fluid during operation of the engine 10.

In the depicted embodiment, seals 28, such as sealing rings, are used to limit leakage of the damping fluid out of the annulus 27. The seals 28 are at least partially received within grooves 31C defined by the body 31 of the outer sleeve 30. The grooves 31C extend annularly around a full circumference of the outer sleeve 30 and extends radially from the radially-outer face 31B of the body 31 towards the radially-inner face 31A. The sealing rings are biased radially outwardly to abut against the bearing housing 25.

Features may be provided to prevent rotation of the outer sleeve 30 relative to the bearing housing 25 and relative to the outer race 23. To do so, the outer sleeve 30 has two anti-rotation features, namely, a bearing-to-sleeve anti-rotation feature 32 configured for preventing rotation of the outer sleeve 30 relative to the outer race 23 of the bearing 21, and a sleeve-to-housing anti-rotation feature 34 configured for preventing rotation of the outer sleeve 30 relative to the bearing housing 25.

In the embodiment shown, the bearing-to-sleeve anti-rotation feature 32 is provided by first tabs 23B of the outer race 23 of the bearing 21 interlocked with second tabs 32A protruding radially inwardly from the body 31 of the outer sleeve 30. The first tabs 23B are axially overlapping the second tabs 32A and are circumferentially interspaced with one another. Stated differently, the first tabs 23B are meshed with the second tabs 32A. The bearing-to-sleeve anti-rotation feature 32 is a redundancy anti-rotation feature since the press fit between the outer sleeve 30 and the outer race 23 may also act to prevent relative rotation of these two components. The bearing-to-sleeve anti-rotation feature 32 may create an interlocking engagement to limit rotation of the outer sleeve 30 relative to the outer race 23. It will be appreciated that that the bearing-to-sleeve anti-rotation feature 32 may be provided by any other suitable arrangement such as, for instance, keyway engagement of the outer sleeve 30 to the outer race 23, pins and tabs, dogs and slots, and so on to name a few.

In the depicted embodiment, the sleeve-to-housing anti-rotation feature 34 is provided by third tabs 34A protruding axially from the body 31 and engaging recesses 25A defined by a member of the bearing housing 25. The third tabs 34A and the second tabs 32A are located on opposite axial ends of the body 31 of the outer sleeve 30. The third tabs 34A may each be received within a corresponding one of the recesses 25A of the bearing housing 25. The third tabs 34A may thus be meshed with the recesses 25A. This may create an interlocking engagement to limit rotation of the outer sleeve 30 relative to the bearing housing 25. The third tabs 34A and/or an axial end face of the body 31 of the outer sleeve 30 may axially abut a portion of the bearing housing 25 to prevent an axial movement of the outer sleeve 30 and of the outer race 23 secured thereto. Again, it will be appreciated that the sleeve-to-housing anti-rotation feature 34 may be provided by any other suitable arrangement such as, for instance, keyway engagement of the outer sleeve 30 to the bearing housing 25, pins and tabs, dogs and slots, and so on to name a few.

As commonly used, the bearing cavity 29 is sealed from an environment outside the bearing cavity 29 by seals. In the embodiment shown, only one of the seals, which is a carbon seal 40, is shown. It will be appreciated that another seal, such as a carbon seal, a labyrinth seal, and so on, may be provided at another location axially offset from the carbon seal 40 to seal the bearing cavity 29. The bearing 21 may be located axially between the carbon seal 40 and the other seal (e.g., carbon seal).

Features may be provided to maintain an axial location of the outer sleeve 30 during use of the gas turbine engine 10. Indeed, vibrations, accelerations, and so on may tend to displace the outer sleeve 30, and the outer race 23 to which it is secured. This may be undesired. In the present embodiment, the outer sleeve 30 further includes an axial retention feature 35 configured for limiting axial movements of the outer sleeve 30 relative to the inner race 22 of the bearing 21.

Figure 3:
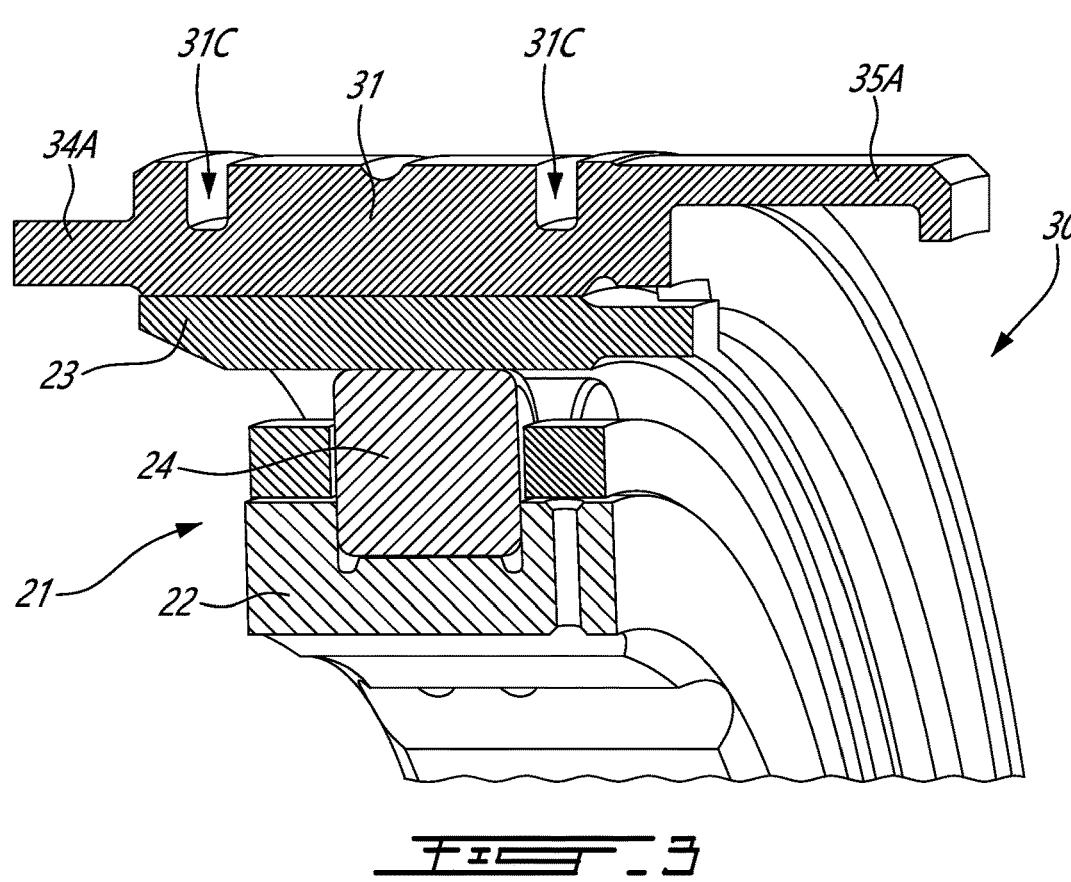
FIG. 3 is a three dimensional cutaway view of a portion of the bearing assembly of FIG. 2.
Figure 4:
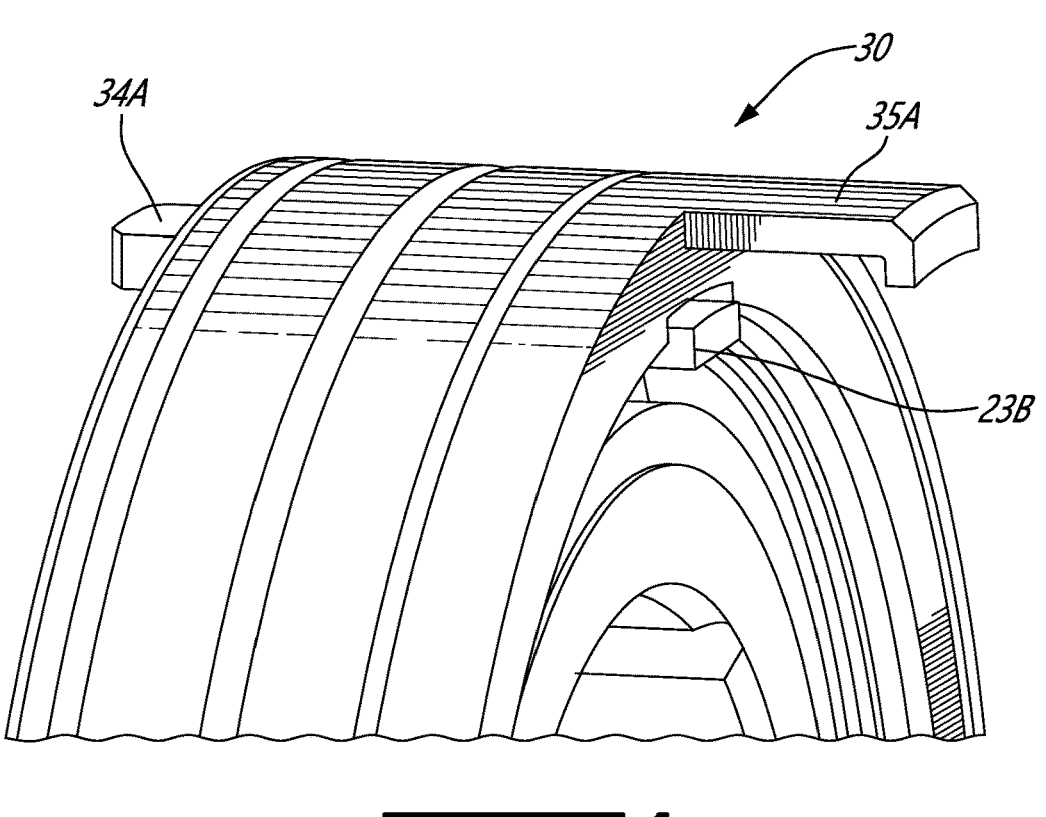
FIG. 4 is a three dimensional view of a portion of the bearing assembly of FIG. 2.

Referring to FIGS. 2-4, in the presented embodiment, the axial retention feature 35 includes axial stand-offs 35A that protrude axially from the body 31 of the outer sleeve 30. The axial stand-offs 35A extend a length suitable to abut the carbon seal 40, herein, to abut a housing 41 of the carbon seal 40. The axial stand-offs 35A may however abut any component of the carbon seal 40 and/or the bearing housing 25. The axial stand-offs 35A may include two axial stand-offs 35A, which may be located at diametrically opposed locations on the outer sleeve 30. More than two stand-offs may be used in some embodiments. Spaces defined circumferentially between two adjacent ones of the axial stand-offs 35A may be provided to allow the damping fluid (e.g., oil) leaking out of the squeeze film damper 26 to flow through those spaces to be scavenged and returned to an oil tank of the gas turbine engine 10.

Referring now to FIG. 5, a method of replacing a squeeze film damping bearing by the bearing 21, which is a conventional bearing, in the bearing housing 25 is shown at 500.

The method 500 includes removing the squeeze film damping bearing from the gas turbine engine 10 at 502; obtaining the bearing 21 at 504; and mounting the outer sleeve 30 to the outer race 23 of the bearing 21 at 506. As previously explained, a diameter of the radially-outer face 31B of the outer sleeve 30 is selected to provide the annulus 27 between the outer sleeve 30 and the bearing housing 25 for receiving the damping fluid.

In the embodiment shown, the mounting of the outer sleeve 30 to the outer race 23 at 504 includes press fitting the outer sleeve 30 to the outer race 23. The mounting of the outer sleeve 30 at 504 may include preventing rotation of the outer sleeve 30 relative to the outer race 23 and preventing rotation of the outer sleeve 30 relative to the bearing housing 25. The method 500 may include installing the bearing 21 with the outer sleeve 30 into the bearing cavity 29 and abutting the axial stand-offs 35A of the outer sleeve 30 against the carbon seal 40.

The disclosed outer sleeve 30 may allow to transform a conventional bearing into one that has thin film damping capabilities. The outer sleeve 30 may be added to existing bearings such that a new part number with integrated damper is not required. This may save costs and simplify assembly of the gas turbine engine 10. The outer sleeve 30 has features to accommodate existing hardware, such as the bearing housing 25, the outer race 23, the carbon seal 40, and so on.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
a shaft rotatable about a central axis;
a bearing housing extending around the shaft and defining a bearing cavity;
a carbon seal radially between the bearing housing and a seal runner mounted to the shaft
a bearing located within the bearing cavity, the bearing rotatably supporting the shaft, the bearing having rolling members disposed radially between an inner race engaged to the shaft and an outer race;
an outer sleeve secured to and extending around the outer race of the bearing, a radially-inner face of the outer sleeve abutting a radially-outer face of the outer race, the outer sleeve having first and second axial sides, the outer sleeve defining axial stand-offs circumferentially distributed around the central axis and protruding from the first axial side, the axial stand-offs abutting the carbon seal;
a sleeve-to-housing anti-rotation feature configured for preventing rotation of the outer sleeve relative to the bearing housing, the sleeve-to-housing anti-rotation feature located on the second axial side of the outer sleeve; and
a squeeze film damper including an annulus defined radially between the outer sleeve and a portion of the bearing housing and axially between seals, the annulus having a damping fluid in the annulus.

2. The aircraft engine of claim 1, wherein the outer sleeve is press fitted on the outer race.

3. The aircraft engine of claim 1, wherein the outer sleeve defines grooves extending from a radially-outer face of the sleeve towards the radially-inner face, the seals received within the grooves.

4. The aircraft engine of claim 3, wherein the seals are sealing rings.

5. The aircraft engine of claim 1, wherein the axial stand-offs include two diametrically opposed axial stand-offs.

6. The aircraft engine of claim 1, comprising a bearing-to-sleeve anti-rotation feature configured for preventing rotation of the outer sleeve relative to the outer race of the bearing.

7. A bearing assembly, comprising:
a bearing housing extending around a central axis to enclose a bearing cavity;
a bearing within the bearing cavity, the bearing having an inner race for engaging a shaft, rolling members rollingly engaged to the inner race, and a compound outer race including:
an outer race rollingly engaging the rolling members; and
an outer sleeve mounted to a radially-outer face of the outer race, the outer sleeve being non-rotatable relative to the outer race of the bearing, the outer sleeve having a body extending axially from a first side to a second side, and axial stand-offs protruding axially from the first side;
a carbon seal radially between the bearing housing and a seal runner mounted to the shaft, the axial stand-offs protruding from the first side of the outer sleeve and abutting the carbon seal; and
a sleeve-to-housing anti-rotation feature configured for preventing rotation of the outer sleeve relative to the bearing housing, the sleeve-to-housing anti-rotation feature located on the second side of the outer sleeve opposite the first side; and
a squeeze film damper including an annulus defined radially between the outer sleeve and the bearing housing and axially between seals, the annulus having a damping fluid in the annulus.

8. The bearing assembly of claim 7, wherein the outer sleeve defines grooves extending from a radially-outer face of the sleeve towards a radially-inner face of the outer sleeve, the seals received within the grooves.

9. The bearing assembly of claim 7, comprising a bearing-to-sleeve anti-rotation feature configured for preventing rotation of the outer sleeve relative to the outer race of the bearing.

10. A method of replacing a squeeze film damping bearing by a conventional bearing in a bearing housing of an aircraft engine, comprising:

removing the squeeze film damping bearing out of the aircraft engine;

obtaining a bearing having rolling members disposed between an inner race and an outer race;

mounting an outer sleeve to the outer race of the bearing, a diameter of a radially-outer face of the outer sleeve selected to provide an annulus between the outer sleeve and the bearing housing, the annulus receiving a damping fluid; and installing the bearing with the outer sleeve into a bearing cavity defined by the bearing housing, including abutting axial stand-offs of the outer sleeve against a carbon seal, the axial stand-offs being circumferentially distributed around a central axis of the aircraft engine and protruding from a first axial side of the outer sleeve, and including preventing rotation of the outer sleeve relative to the bearing housing using a sleeve-to-housing anti-rotation feature located on a second axial side of the outer sleeve.

11. The method of claim 10, wherein the mounting of the outer sleeve to the outer race includes press fitting the outer sleeve to the outer race.

12. The method of claim 10, wherein the mounting of the outer sleeve includes preventing rotation of the outer sleeve relative to the outer race.

\* \* \* \* \*